(12) United States Patent
Rock et al.

(10) Patent No.: US 8,179,901 B2
(45) Date of Patent: May 15, 2012

(54) SYSTEM AND METHOD FOR SQUELCHING A RECOVERED CLOCK IN AN ETHERNET NETWORK

(75) Inventors: Jason C. Rock, Austin, TX (US); James D. Barnette, Austin, TX (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 490 days.

(21) Appl. No.: 12/029,230

(22) Filed: Feb. 11, 2008

(65) Prior Publication Data

US 2009/0201924 A1    Aug. 13, 2009

(51) Int. Cl.
H04L 12/28    (2006.01)

(52) U.S. Cl. .................... 370/395.62; 370/503

(58) Field of Classification Search .............. 370/389, 370/216, 354, 395.62, 503
See application file for complete search history.

(56) References Cited

U.S. PATENT DOCUMENTS

| | | | |
|---|---|---|---|
| 5,737,316 A | 4/1998 | Lee | |
| 6,320,872 B1* | 11/2001 | Asbjorn et al. | 370/466 |
| 6,700,898 B1 | 3/2004 | Barakat et al. | |
| 6,877,105 B1* | 4/2005 | Watanabe et al. | 714/4.4 |
| 7,002,941 B1* | 2/2006 | Treadaway et al. | 370/338 |
| 7,284,182 B2 | 10/2007 | Raahemi | |
| 2002/0049933 A1 | 4/2002 | Nyu | |
| 2002/0181633 A1* | 12/2002 | Trans | 375/354 |
| 2003/0227965 A1* | 12/2003 | Webb et al. | 375/219 |
| 2005/0249244 A1* | 11/2005 | McNamara et al. | 370/474 |
| 2005/0286410 A1* | 12/2005 | Truong et al. | 370/216 |
| 2006/0077995 A1* | 4/2006 | Lenell | 370/412 |
| 2006/0114833 A1* | 6/2006 | Castellano et al. | 370/248 |
| 2007/0153726 A1* | 7/2007 | Bar-Sade et al. | 370/329 |
| 2008/0002793 A1* | 1/2008 | Giorgetta et al. | 375/346 |
| 2008/0089235 A1* | 4/2008 | Kotrla et al. | 370/242 |
| 2009/0080346 A1* | 3/2009 | Powell et al. | 370/257 |
| 2010/0138584 A1* | 6/2010 | Lindsay et al. | 710/313 |

OTHER PUBLICATIONS

Huawei Technologies Co., Ltd. (2007) Technical White Paper for clock over Ethernet [White paper].
Office Action fro USPTO dated Apr. 9, 2010 for U.S. Appl. No. 12/029,195.

* cited by examiner

*Primary Examiner* — Dang Ton
*Assistant Examiner* — Mandish Randhawa
(74) *Attorney, Agent, or Firm* — Klein, O'Neil & Singh, LLP (57) ABSTRACT

A system and method for squelching a recovered clock in an Ethernet network. In one embodiment the invention provides a method for squelching a recovered clock in an Ethernet network comprising a local node coupled to a remote node by a link, the method including receiving a descrambler status signal, receiving a remote receiver status signal, receiving a link status signal, and squelching the recovered clock signal based on the descrambler status signal, the remote receiver status signal, and the link status signal.

20 Claims, 5 Drawing Sheets

SYSTEM AND METHOD FOR SQUELCHING A RECOVERED CLOCK IN AN ETHERNET NETWORK

BACKGROUND OF THE INVENTION

The present invention relates generally to network communications, and more particularly to a system and method for squelching a recovered clock in an Ethernet network.

Network communications involve a number of different technologies, standards and protocols. Ethernet networks are perhaps the most pervasive type of network in use today. While becoming a de facto standard may have been based on history, Ethernet has evolved with the times to accommodate the networking needs of the present day.

The nature of the use of Ethernet networks has also changed over time. Communications involving the exchange of digital data have been growing exponentially since the advent and now widespread use of the Internet. A variety of new applications make use of Ethernet networks, including, for example, applications exchanging voice and/or video data. While some data transported by Ethernet networks is not time sensitive, other data is time sensitive or even time critical. In the case of time sensitive data, rigorous demands for predictable timing can be required of a network. Applications sensitive to the timing of data can include, for example, quality of service (QOS) and synchronization type applications. More specific applications include voice over internet protocol (VOIP), data center, and backhaul communication applications. A number of time sensitive type applications may make demands of networks not contemplated by the drafters and developers of standards related to such networks.

SUMMARY OF THE INVENTION

In one aspect the invention provides a method for squelching a recovered clock in an Ethernet network comprising a local node coupled to a remote node by a link, the method comprising receiving a descrambler status signal, receiving a remote receiver status signal, receiving a link status signal, and squelching the recovered clock signal based on the descrambler status signal, the remote receiver status signal, and the link status signal.

In another aspect the invention provides a system for squelching a recovered clock signal in an Ethernet network comprising a local node coupled to a remote node by a link, the system comprising clock squelch circuitry configured to receive a descrambler status signal, a remote receiver status signal, a link status signal and the recovered clock signal, wherein the clock squelch circuitry is configured to squelch the recovered clock signal based on the descrambler status signal, the remote receiver status signal, and the link status signal.

In another aspect the invention provides An Ethernet switch configured to route data from a first port to a second port, the first port and the second port each configured for coupling to a transmission media connected to computer systems, the Ethernet switch including a switch coupled to each of the ports by at least a media access controller integrated circuit and a physical layer integrated circuit, the physical layer integrated circuit configured to receive data from and transmit data to the transmission medium, the physical layer integrated circuit including circuitry for squelching a recovered clock in an Ethernet network, the circuitry comprising clock recovery circuitry configured to generate a recovered clock signal, receiver circuitry configured to generate a descrambler status signal and a remote receiver status signal, link monitor circuitry configured to generate a link status signal, clock squelch circuitry configured to receive the descrambler status signal, the remote receiver status signal, and the link status signal, wherein the clock squelch circuitry is configured to squelch the recovered clock signal based on the descrambler status signal, the remote receiver status signal, and the link status signal.

In another aspect the invention provides a method for squelching a recovered clock in an Ethernet network, the Ethernet network comprising an Ethernet switch configured to route data from a first port to a second port, the first port and the second port each configured for coupling to a transmission media connected to computer systems, the Ethernet switch including a switch coupled to each of the ports by at least a media access controller integrated circuit and a physical layer integrated circuit, the physical layer integrated circuit configured to receive data from and transmit data to the transmission medium and to execute the method, the method comprising generating a recovered clock signal, generating a descrambler status signal, generating a remote receiver status signal, generating a link status signal, receiving the descrambler status signal, the remote receiver status signal, and the link status signal, and squelching the recovered clock signal based on the descrambler status signal, the remote receiver status signal, and the link status signal.

These and other aspects of the invention are more fully comprehended upon review of this diclosure.

DETAILED DESCRIPTION

In an Ethernet network, often the physical layer of one Ethernet device, a local device, can be linked to a remote device. In some instances, however, the link becomes disabled or unstable (e.g., dropped). For a number of Ethernet applications, a link drop notification period of 350 milliseconds (ms) or 750 ms is too long for the application to function properly. For example, in applications incorporating Synchronous Ethernet, a protocol enabling precise synchronization of clocks, Ethernet functional blocks of the local device or downstream devices (e.g., remote devices) often do not or cannot respond quick enough to a notification of link drop to avoid at least some use of the dropped link.

Turning now to the drawings, systems and methods for squelching a recovered clock in an Ethernet network are illustrated. In one aspect of the invention, a clock squelch circuit disables a recovered clock signal shortly after any indication of link drop, thereby ensuring non-operation of any Ethernet functional blocks or downstream devices (e.g., remote devices) receiving the recovered clock signal. In one embodiment, the recovered clock is squelched within 1 ms of a link drop.

The clock squelch circuit is often implemented within a physical layer block (PHY) coupled to a media access control block (MAC). The PHY generally uses a clock recovery circuit, usually incorporating a phase locked loop (PLL), to recover a clock signal from incoming data. The recovered clock signal is often provided to several functional blocks within the Ethernet PHY as well as to possibly a number of downstream devices. In a number of embodiments, squelching the recovered clock quickly and reliably assures that any functional blocks receiving the recovered clock, and potentially more importantly, downstream devices that receive or rely on a received clock signal, are effectively disabled or rendered non-functional for the period while the clock is squelched.

In one aspect of the invention, clock squelch circuitry receives a number signals from an Ethernet PHY and determines whether a recovered clock should be squelched based on those signals. In one embodiment, the received Ethernet PHY signals are 1000-Base-T type signals. In some embodiments, the clock squelch circuitry can be incorporated into an Ethernet switch having one or more ports coupled to a transmission medium. In such case, the Ethernet switch includes MAC circuitry and PHY circuitry. In other embodiments, the clock squelch circuitry can be incorporated into an Ethernet transceiver. In such case, the Ethernet transceivers supports a number of different Ethernet communication speeds and protocols relating to incremental versions of the governing IEEE standards.

Figure 1:
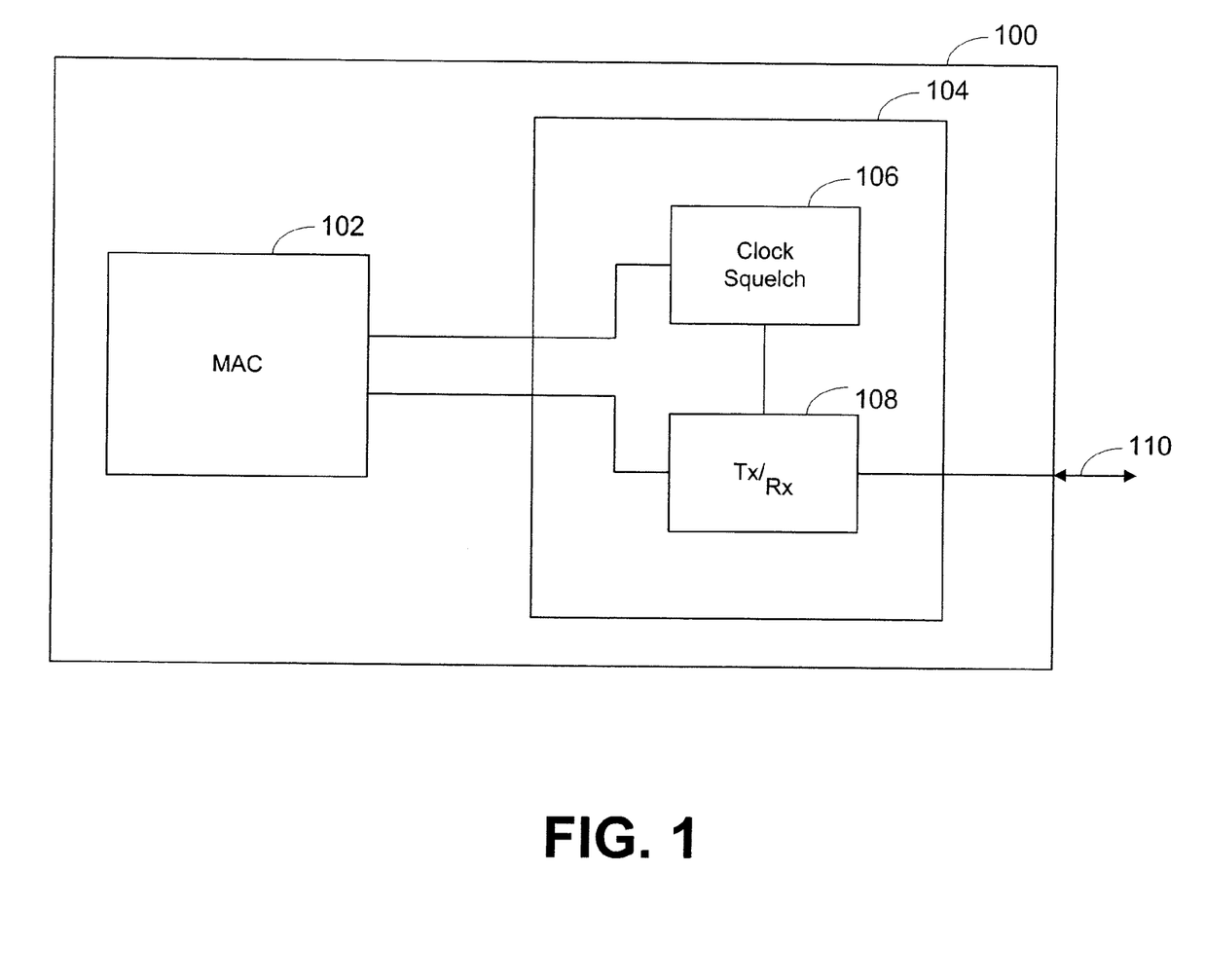
FIG. 1 is a block diagram of an Ethernet transceiver including a MAC interface block in communication with a PHY block having a clock squelch block in accordance with aspects of the invention.

FIG. 1 is a block diagram of an Ethernet transceiver 100 in accordance with aspects of the invention. The Ethernet transceiver includes a MAC interface 102 in communication with a PHY 104 having logic circuitry providing a clock squelch block 106. In many embodiments, the MAC and the PHY are implemented as separate chips or chipsets. The PHY 104 includes a transceiver block 108 coupled to the clock squelch block 106. In various embodiments, however, the logic circuitry providing the clock squelch block may be external to the PHY. The clock squelch block 106 and the transceiver block 108 are coupled to the MAC 102. The transceiver 108 is coupled to a medium 110, such as a twisted pair cable or other suitable Ethernet communication medium. In general, another end of the communication medium is coupled to a PHY forming another node in a network. In one embodiment, the medium 110 can be either copper or fiber. In other embodiments, the medium can be made of other materials suitable for data communication.

In operation, the transceiver 108 can process data from the MAC, format the data for transmission, and transmit the data over the communication medium 110. Similarly, the transceiver 108 can receive data over the communication medium, process the data, and provide the formatted data to the MAC. In receiving data from the medium, the transceiver 108 can recover a clock signal from the data using clock recovery circuitry. The clock can be recovered from either a copper medium or a fiber medium.

The PHY also includes logic circuitry providing the clock squelch block 106. The clock squelch block receives and provides information from and to the MAC. In general, the clock squelch block determines PHY states and status signals in accordance with applicable Ethernet standards. For example, in one embodiment the clock squelch block may determine status and signals, except as discussed to the contrary herein, in accordance with clause 40 (Physical Coding Sublayer (PCS), Physical Medium Attachment (PMA) sublayer and baseband medium, types 1000BASE-T) of Part 3 of The IEEE Std. 802.3, incorporated by reference herein.

Clause 40 of the IEEE 802.3 specification defines minimum time periods for notification of link drop of 350 ms or 750 ms, depending on whether the Ethernet PHY is configured as a master or a slave. For a number of Ethernet applications, a link drop notification period of 350 ms or 750 ms may be too long for the application to function properly. For example, applications incorporating Synchronous Ethernet, a protocol enabling precise synchronization of clocks, may need notification of a potential link drop in a shorter period of time. Without early link drop notification, a number of Ethernet devices, particularly downstream devices, may continue to operate. One way to inhibit operation of downstream devices or local functional blocks is to inhibit or squelch the recovered clock. The downstream devices/nodes often receive on or more input clocks. Squelching one of the input clocks can force a downstream device to switch clock inputs, which is often desired.

Accordingly, the clock squelch block can receive the recovered clock along with one or more signals indicative of the status of the link from the local device (e.g., transceiver block) to a remote device. In the event that any of the status signals are indicative of link failure or link drop, the clock squelch circuit can squelch the recovered clock. In the event that none of the status signals are indicative of link failure or link drop, the clock squelch circuit can output the recovered clock to the transceiver block and/or the MAC block. In other embodiments, the clock squelch circuit can output the recovered clock to the transceiver block and/or the MAC block when none of the status signals are indicative of link failure and the active link is not in a 10BASE-T mode or a 1000BASE-T master mode. The recovered clock can be unstable or unreliable when the active link is in the 10BASE-T mode or the 1000BASE-T master mode. In several embodiments, the transceiver can distribute the recovered clock to one or more downstream devices.

Figure 2:
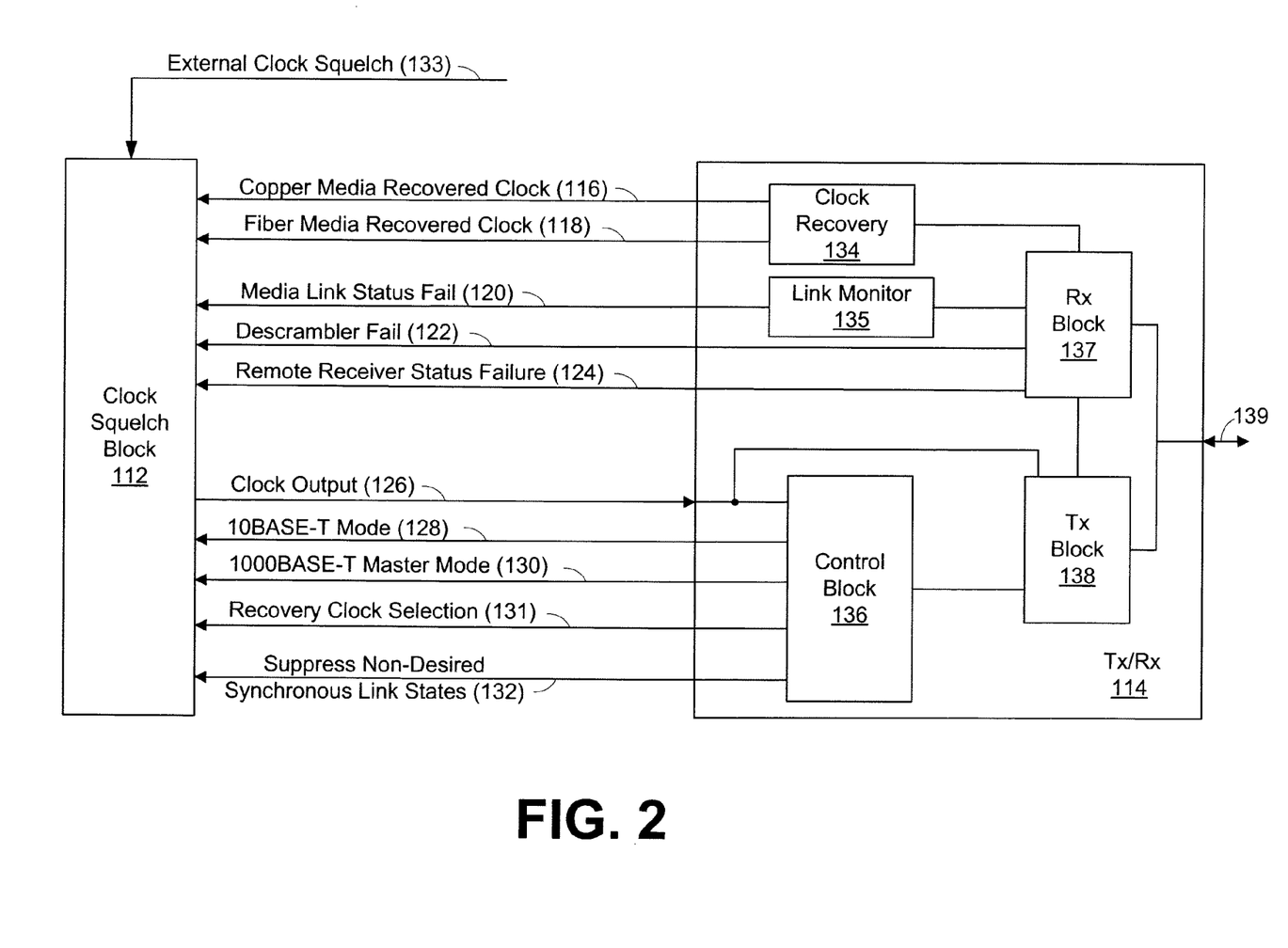
FIG. 2 is a block diagram of a clock squelch block coupled to a transceiver (Tx/Rx) block in accordance with aspects of the invention.

FIG. 2 is a block diagram of a clock squelch block 112 coupled to a transceiver (Tx/Rx) block 114 in accordance with aspects of the invention. The signals coupling the clock squelch block 112 and the transceiver block 114 include a copper media recovered clock signal 116, a fiber media recovered clock signal 118, a media link status fail signal 120, a descrambler fail signal 122, a remote receiver status failure signal 124, a clock output signal 126, a 10BASE-T mode signal 128, a 1000BASE-T master mode signal 130, a recovery clock selection signal 131 and a suppress non-desired synchronous link states signal 132. An external clock squelch signal 133 is also coupled to the clock squelch block 112.

The transceiver (Tx/Rx) 114 includes a clock recovery block 134, a link monitor block 135, a control block 136, a receive block 137, and a transmit block 138. The transmit block 138 and receive block 137 are coupled to a communication medium 139, such as one or more twisted pairs or fiber. The receive block 137 is coupled to the clock recovery block 134, the link monitor block 135 and the transmit block 137. The control block 136 is coupled to the transmit block 138 and, although not illustrated, is generally coupled to all of the blocks in the transceiver. In other embodiments, each transceiver block is coupled to all other transceiver blocks.

In the illustrated embodiment, the copper media recovered clock signal 116 and fiber media recovered clock signals are coupled to the clock recovery block 134. The media link status fail signal 120 is coupled to the link monitor block 135. The descrambler fail signal 122 and remote receiver status failure signal 124 are coupled to the receive block 137. The clock output signal 126 is coupled to the control block 136 and the transmit block 138. The 10BASE-T mode signal 128, the 1000BASE-T master mode signal 130, the recovery clock selection signal 131 and the suppress non-desired synchronous link states signal 132 are coupled to the control block 136.

The copper media recovered clock 116, fiber media recovered clock 118 and recovery clock selection 131 signals are provided to the clock squelch block 112 by the transceiver block 114. The clock recovery circuitry 134 within the transceiver 114 can generate a recovered clock from a copper medium and/or a fiber medium. The copper media recovered clock 116 and the fiber media recovered clock 118 are then provided by the transceiver block to the clock squelch block. If the link is stable and the recovered clock is reliable, then the copper media recovered clock or the fiber media recovered clock can be output, as the clock output signal, to the transceiver 114. In the illustrated embodiment, the recovery clock selection signal can be used to select one of the copper media recovered clock or the fiber media recovered clock to be output as the clock output signal. In some embodiments, the recovered clock signals can run at 25 mega hertz (MHz), 125 MHz or zero (e.g., squelched or disabled).

The media link status fail signal 120 is provided to the clock squelch block 112 by the transceiver block 114. The link monitor circuitry 135 within the transceiver 114 can monitor the status of the link from the local device (e.g., the transceiver block 114) to a remote device. The media link status fail signal is indicative of the status of the medium used for data transport by the Ethernet PHY. In several embodiments, the link status signal is used by a number of functional transceiver blocks for control functions. In one embodiment, the media link status fail signal can take any of three values including "FAIL" indicating that no valid link is established, "READY" indicating that the link is intact and ready to be established, and "OK" indicating that a valid link has been established and that signals can be reliably received from the remote PHY. In another embodiment, the media link fail status signal can take values of "FAIL" and "OK". In such case, the media link fail signal can be a digital signal where the asserted value of the signal is "FAIL".

The descrambler fail signal 122 is provided to the clock squelch block 112 by the transceiver block 114. The descrambler fail signal can be generated by the receiver circuitry 137 within the transceiver block 114 based on the status of the descrambler for the local PHY. The descrambler fail signal can be used to convey whether the descrambler has achieved synchronization. In the 802.3 specification, a scrambler is used in the transmit path to ensure sufficient transitions in the transmitted data to support clock recovery. Data transmitted to the medium is generally scrambled using a polynomial cipher. The descrambler then reverses the scrambling operation to properly recover the data using the same polynomial cipher. In the illustrated embodiment, the descrambling is performed by descrambling circuitry within the transceiver block. In one embodiment, the descrambler fail signal can take values of "OK" indicating that the descrambler has achieved synchronization, and "NOT_OK" indicating that the descrambler has not synchronized. In such case, the descrambler fail signal can be a digital signal where the asserted value of the signal is "NOT_OK". In one embodiment, the descrambler status signal is referred to as "scr_status".

The remote receiver status failure signal 124 is provided to the clock squelch block 112 by the transceiver block 114. The remote receiver status failure signal can be generated by the receiver circuitry 137 within the transceiver block based on the status of the receive link at the remote PHY as reported by the remote PHY. The remote PHY can communicate this information via a "loc_rcvr_status" parameter, which can be provided to the receiver circuitry. The remote receiver status failure signal can be used to communicate whether the reliable operation of the remote PHY is detected or not. In one embodiment, the criteria for determining what constitutes reliable operation of the remote PHY is decided by the implementer of the transceiver block. In one embodiment, for example, the criteria can be based on setting the remote receiver status failure signal to "NOT_OK" until the "loc_rcvr_status" parameter is "OK" and then asserting the detected value of the remote receiver status failure signal after proper receive decoding has been achieved. In such case, the remote receiver status failure signal can be a digital signal where the asserted value of the signal is "NOT_OK". In one embodiment, the remote receiver status failure signal is referred to as "rem_rcvr_status".

The 10BASE-T mode signal 128 and the 1000BASE-T master mode signal 130 are provided to the clock squelch block 112 by control circuitry 136 within the transceiver block 114. Under the 802.3 family of specifications, several variations in speed and topology of Ethernet networks are provided. These variations generally include 10BASE-T provided at 10 mega bits per second (Mbps) over two twisted-pair cables, 100BASE-T provided at 100 Mbps over two twisted pair cables and 1000BASE-T provided at 1000 Mbps over four twisted pair cables. In several embodiments, the transceiver block 114 is configured to support at least 10BASE-T, 100BASE-T, and 1000BASE-T communications.

The reliability of clock signals generated by clock recovery circuitry in the transceiver block can vary based on the mode of communication. For example, when the active link is using a 10BASE-T mode, the recovered clock can be unreliable. The 10BASE-T mode signal is indicative of whether the active link is using the 10BASE-T mode, and can be generated by the control circuitry 136 within the transceiver block 114. In order to allow Ethernet devices of different capabilities to communicate, an autonegotiation sequence is often performed to determine a common speed and protocol that can be used between the devices to communicate. In addition, one device is commonly designated as the master while the other is designated as the slave on the communication link. When the active link is using a 1000BASE-T master mode, the recovered clock can be unreliable. The 1000BASE-T master mode signal is indicative of whether the active link is in the 1000BASE-T master mode, and can be generated by the control circuitry 136 within the transceiver block 114.

In some embodiments, it may be desirable to ignore the status of the 10BASE-T mode signal and the 1000BASE-T master mode signal. The suppress non-desired synchronous link states signal is provided to the clock squelch block 112 by control circuitry 136 within the transceiver block 114. In several embodiments, the transceiver block includes a configurable input that controls the state of the suppress non-desired synchronous link states signal. In one embodiment, the configurable input is a programmable register. In such case, the configurable input can be modified by writing to the programmable register. In several embodiments, the register is provided by circuitry within an ASIC implementation of an Ethernet transceiver.

The external clock squelch signal 133 is provided to the clock squelch block 112 by an external input to the PHY. In one embodiment, the external input can be provided by a user, a CPU or another logic circuit. In the case where the external input is provided by a user, the user can provide the input in any number of ways, including, for example, using a switch, a keyboard or mouse and/or a register in an ASIC or programmable logic device. In the event that the external clock squelch signal is asserted, the clock squelch block can immediately squelch any recovered clock signal. In one embodiment, the external clock squelch signal can be thought of as a manual override to immediately squelch the recovered clock.

In one embodiment, only a single recovered clock signal is provided to the clock squelch circuit. In such case, the copper media recovered clock, fiber media recovered clock, and recovery clock selection signals are not used. In one embodiment, the clock squelch circuit is not provided with the 10BASE-T mode and 1000BASE-T master mode signals. In such case, the clock squelch circuit functions without regard to the 10BASE-T mode and 1000BASE-T master mode signals. In one embodiment, the clock squelch circuit operates without the suppress non-desired synchronous link states signal. In some embodiments, the clock output signal is provided to the MAC interface block 102. In several embodiments, the clock output signal is provided to downstream devices (e.g., remote devices).

Figure 3:
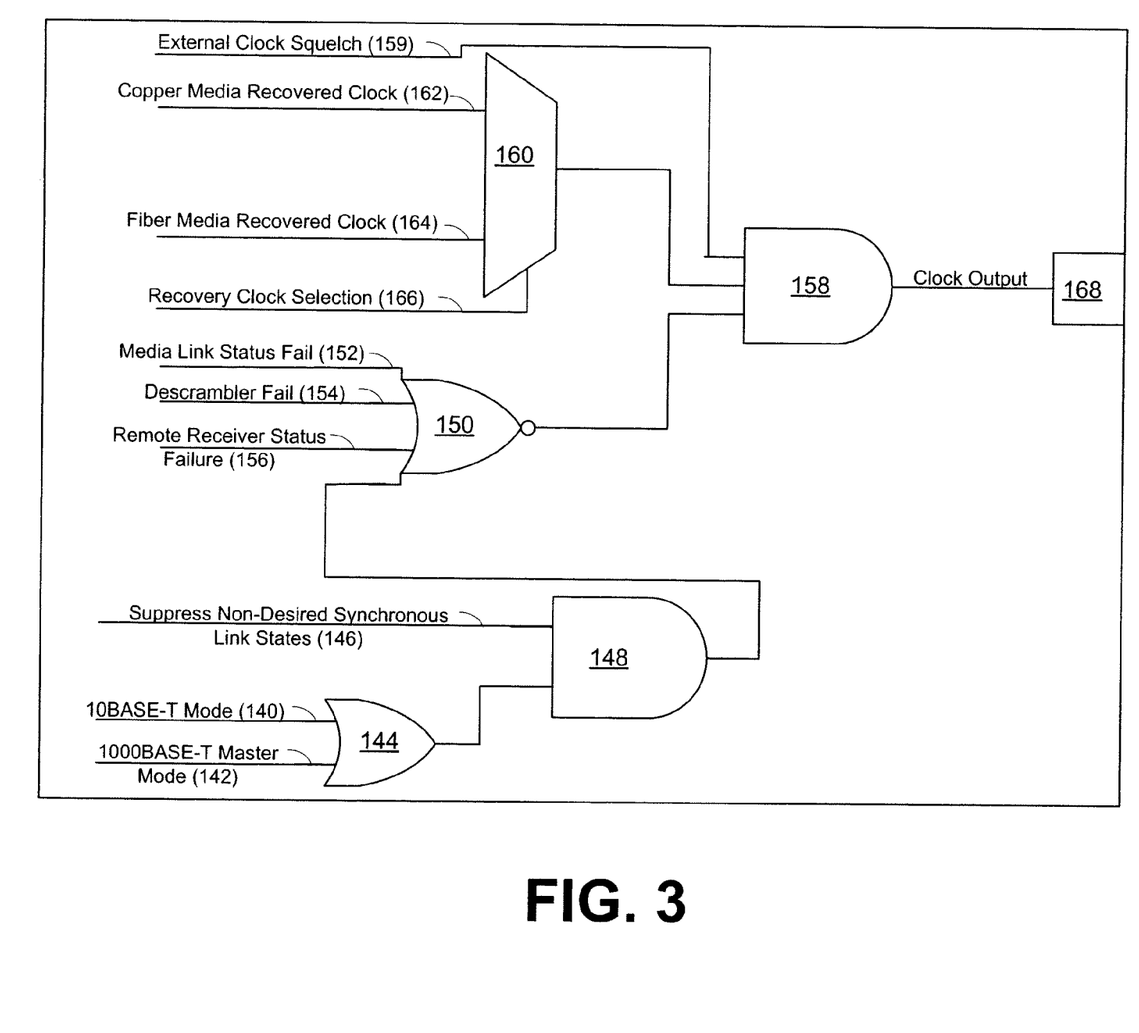
FIG. 3 is a schematic diagram of a clock squelch circuit in accordance with aspects of the invention.

FIG. 3 is a schematic diagram of a clock squelch circuit in accordance with aspects of the invention. The circuit includes an OR gate 144 having an input coupled to a 10BASE-T mode signal 140 and having another input coupled to a 1000BASE-T master mode signal 142. The output of the OR gate 144 is coupled to an input of an AND gate 148. The AND gate 148 includes another input coupled to a suppress non-desired synchronous link states signal 146. The output of AND gate 148 is coupled to an input of a NOR gate 150. The NOR gate 150 includes three other inputs. A second input is coupled to a media link status fail signal 152. A third input is coupled to a descrambler fail signal 154. A fourth input is coupled to a remote receiver status failure signal 156. The output of NOR gate 150 is coupled to an input of a second AND gate 158. Another input of AND gate 158 is coupled to the output of a two channel multiplexer 160. A first channel input to the multiplexer 160 is coupled to a copper media recovered clock signal 162. A second channel input to the multiplexer 160 is coupled to a fiber media recovered clock signal 164. A selection input to the multiplexer 160 is coupled to a recovery clock selection signal 166. Another input of AND gate 158 is coupled to an external clock squelch signal 159. The output of AND gate 158, a clock output signal, is coupled to a clock output terminal 168.

In operation, if any of the media link status fail, descrambler fail or remote receiver status failure signals are asserted (e.g., indicative of failure), the output of NOR gate 150 will be low and whichever of the copper media recovered clock signal or fiber media recovered clock signal currently selected by the recovery clock selection signal will effectively be squelched at the output of AND gate 158. Collectively, the media link status fail, descrambler fail and remote receiver status failure signals can be thought of as providing link status. In a number of embodiments, the link status provided by the media link status fail, descrambler fail and remote receiver status failure signals is provided within a much shorter time period than is specified by the IEEE 802.3 standard. For example, in one embodiment, the link status provided by the media link status fail, descrambler fail and remote receiver status failure signals is provided within 1 ms from a link failure.

In addition, if either of the 10BASE-T mode or 1000BASE-T master mode signals are asserted in conjunction with suppress non-desired synchronous link states signal, the recovered clock will be effectively squelched at the output of AND gate 158. If, however, the suppress non-desired synchronous link states signal is not asserted, then the 10BASE-T mode or 1000BASE-T master mode signals will generally not have an effect on the clock output signal. That is, the recovered clock will not be effectively squelched due to either of the 10BASE-T mode or 1000BASE-T master mode signals when the suppress non-desired synchronous link states signal is not asserted.

If the external clock squelch signal 159 is asserted, which is an active low signal, then any recovered clock signal will be effectively squelched by AND 158. In such case, the clock output signal is squelched.

In the illustrated embodiment, the clock squelch circuit is implemented using particular logic gates. In other embodiments, other programmable logic constructs can be used. In some embodiments, the clock squelch circuit is implemented using logic circuitry within a single chip such as an ASIC. In one such embodiment, the clock squelch circuit is implemented within an ASIC functioning as an Ethernet transceiver. In other embodiments, the clock squelch circuit is implemented using multiple chips sharing information. In some embodiments, the clock squelch circuit can be implemented using any combination of programmable logic devices, processors, memory, discrete logic components, data buses and/or other processing elements that share information. In various embodiments, the clock squelch circuit is implemented within an ASIC that incorporates both digital components and analog components, such as a mixed-mode ASIC. In such case, any number of components common to an Ethernet transceiver can be included within the mixed-mode ASIC.

Figure 4:
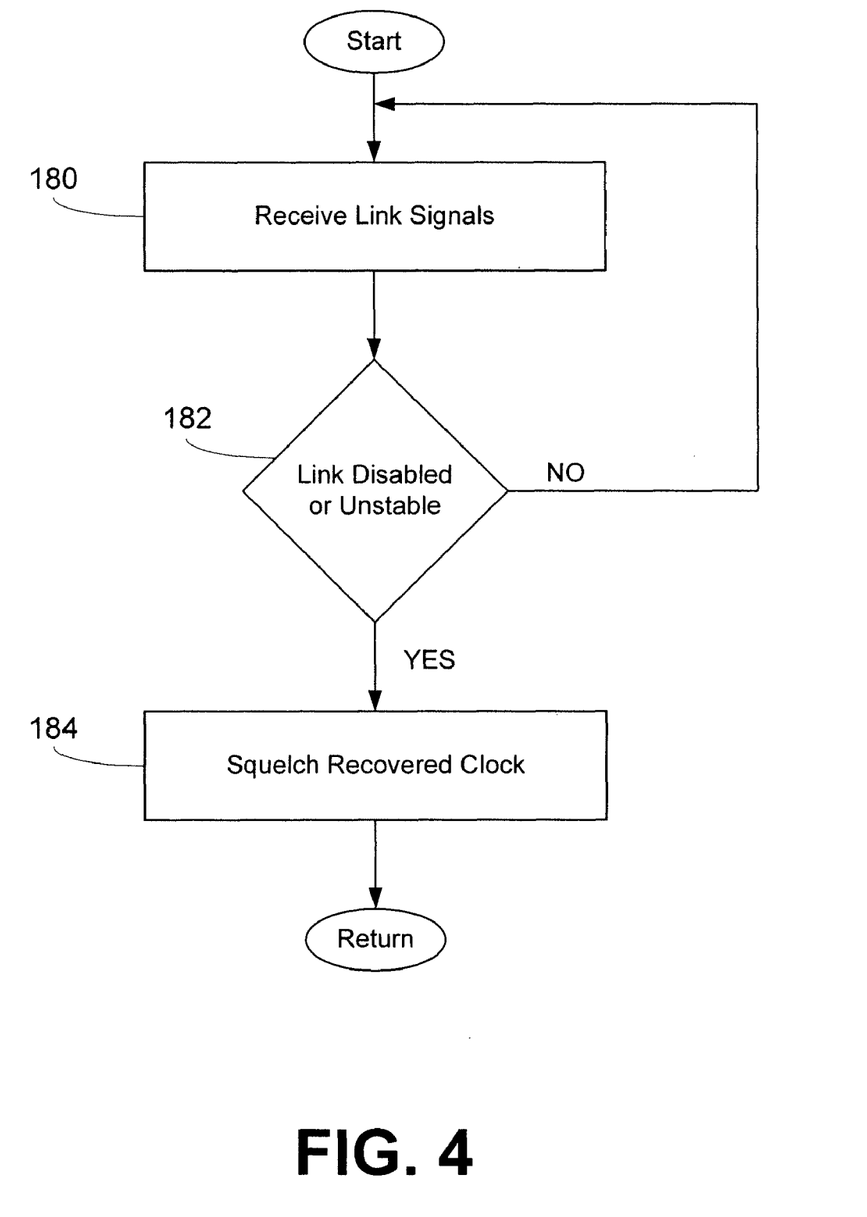
FIG. 4 is a flow diagram of a process for squelching a recovered clock in accordance with aspects of the invention.

FIG. 4 is a flow diagram of a process for squelching a recovered clock in accordance with aspects of the invention. In particular embodiments, the process is performed in accordance with the link failure block of FIG. 2 or FIG. 3. In block 180, the process receives link status signals. In one embodiment, the link status signals can include any of media link status fail, descrambler fail or remote receiver status failure signals. In one embodiment, the link status signals include the 10BASE-T mode or 1000BASE-T master mode signals. In block 182, the process determines whether the link is disabled or unstable based on the link status signals. If the process determine that the link is not disabled or unstable, then the process returns to block 180. If the process determines that the link is disabled and/or unstable, the process squelches the recovered clock in block 184. The process then returns.

Figure 5:
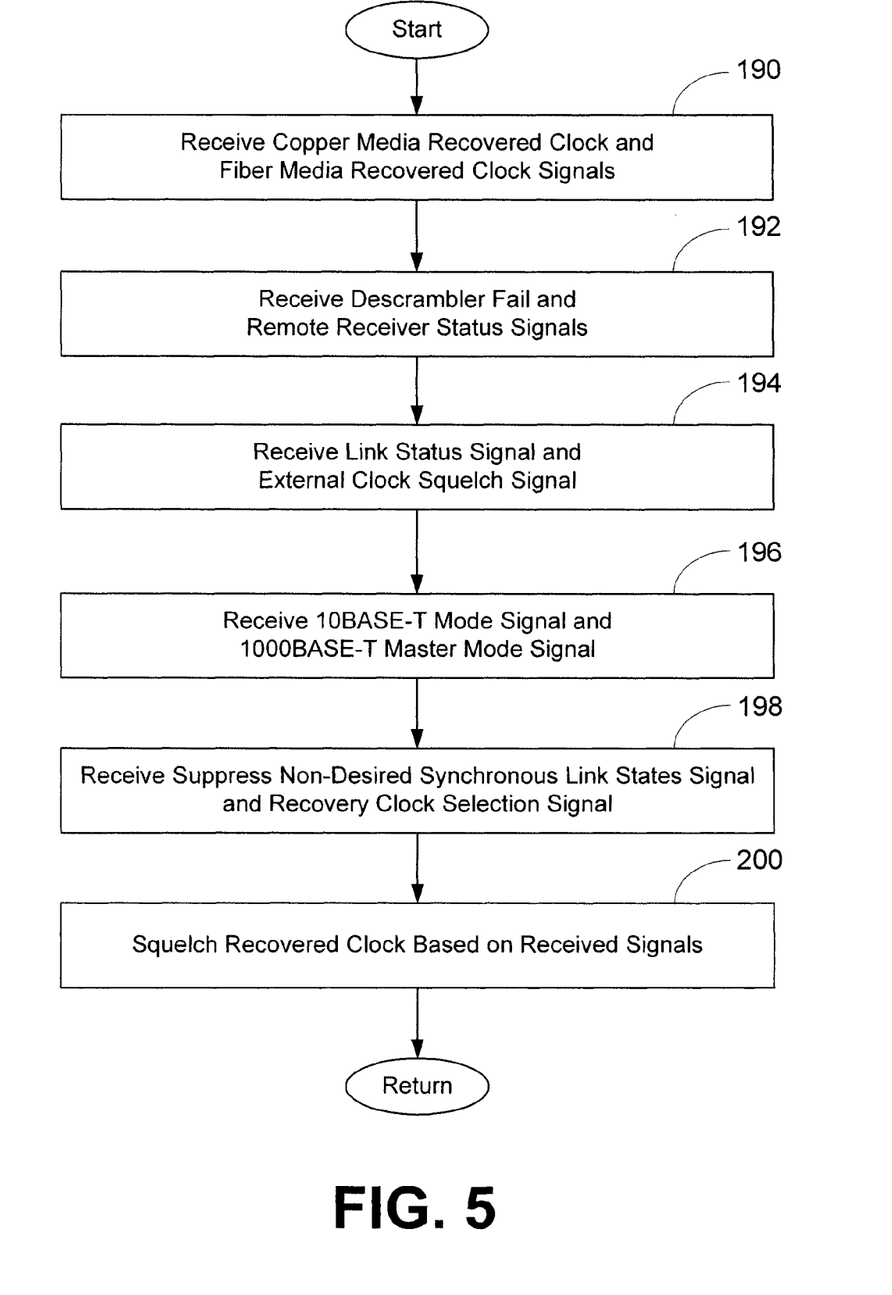
FIG. 5 is a flow diagram of a process for squelching a recovered clock in accordance with aspects of the invention.

FIG. 5 is a flow diagram of a process for squelching a recovered clock in accordance with aspects of the invention. In some embodiments, the process is performed in accordance with the link failure block of FIG. 2 or FIG. 3. In block 190, the process receives copper media recovered clock and fiber media recovered clock signals. In block 192, the process receives descrambler fail and remote receiver status failure signals. In block 194, the process receives a link status signal and an external clock squelch signal. In block 196, the process receives 10BASE-T mode and 1000BASE-T master mode signals. In block 198, the process receives a suppress non-desired synchronous link states signal and a recovery clock selection signal. In block 200, the process squelches the recovered clock based on the received signals. In some embodiments, the recovered clock is not squelched. The process then returns.

In a number of embodiments, the process squelches the recovered clock signal in a sufficiently short period of time as to satisfy timing requirements for synchronous Ethernet standards such as IEEE 1588 and/or ITU G.8261. In some embodiments, the process performs the actions illustrated in FIG. 5 in a different order. In several embodiments, a number of the actions illustrated in FIG. 5 are performed simultaneously. For example, in one embodiment, all of the signals indicated in blocks 190 to 198 are received by the process simultaneously. In some embodiments, only some of the actions indicated by blocks 190 to 198 are performed by the process. In one embodiment, only some of the signals indicated in blocks 190 to 198 are used by the process.

The invention therefore provides a system and method for squelching a recovered clock in an Ethernet network. Although the invention has been described with respect to certain embodiments, it should be recognized that the invention may be practiced other than as specifically described, the invention comprising the claims and their insubstantial variations supported by this disclosure.

What is claimed is:

1. A method for squelching, at a local node, a recovered clock signal in an Ethernet network comprising the local node coupled to a remote node by a link, the method comprising:
   receiving a descrambler status signal;
   receiving a remote receiver status signal;
   receiving a link status signal;
   receiving a signal indicative of whether an active link is in a 10BASE-T mode; receiving a signal indicative of whether the active link is in a 1000BASE-T master mode:
   squelching the recovered clock signal based on the descrambler status signal, the remote receiver status signal, the link status signal, the 10BASE-T mode signal, and the 1000BASE-T master mode signal.

2. The method of claim 1:
   wherein the remote receiver status signal is indicative of a status of the link as reported by the remote node.

3. The method of claim 1:
   wherein the descrambler status signal is indicative of a status of a descrambler at the local node.

4. The method of claim 1:
   wherein the link status signal is indicative of a status of the link as determined by circuitry of the local node.

5. The method of claim 1, wherein squelching the recovered clock signal based on the descrambler status signal, the remote receiver status signal, and the link status signal comprises squelching the recovered clock signal when any of the descrambler status signal, the remote receiver status signal, and the link status signal indicates failure.

6. The method of claim 1, wherein the recovered clock signal is any of a clock signal recovered from a copper media and a clock signal recovered from a fiber media.

7. The method of claim 1, further comprising:
   receiving an external clock squelch signal;
   wherein the squelching the recovered clock signal based on the descrambler status signal, the remote receiver status signal, and the link status signal comprises squelching the recovered clock signal when the external clock squelch signal is asserted.

8. The method of claim 1, wherein the recovered clock signal is squelched within 1 millisecond of a link failure.

9. The method of claim 1:
   wherein the recovered clock signal is coupled to at least one downstream node; and
   wherein the squelching the recovered clock signal prevents use of the recovered clock signal at the at least one downstream node.

10. A system for squelching a recovered clock signal in an Ethernet network comprising a local node coupled to a remote node by a link, the system comprising:
    clock squelch circuitry configured to receive a descrambler status signal, a remote receiver status signal, a link status signal, a signal indicative of whether an active link is in a 10BASE-T mode, a signal indicative of whether the active link is in a 1000BASE-T master mode, and the recovered clock signal;
    wherein the clock squelch circuitry is configured to squelch the recovered clock signal based on the descrambler status signal, the remote receiver status signal, the link status signal, the 10BASE-T mode signal, and the 1000BASE-T master mode signal.

11. The system of claim 10:
    wherein the remote receiver status signal is supplied to the clock squelch circuitry by receiver circuitry; and
    wherein the remote receiver status signal is indicative of a status of the link as reported by the remote node.

12. The system of claim 10:
    wherein the descrambler status signal is generated by receiver circuitry; and
    wherein the descrambler status signal is indicative of a status of a descrambler at he local node.

13. The system of claim 10:
    wherein the link status signal is generated by link monitor circuitry; and
    wherein the link status signal is indicative of a status of the link as determined by the local node.

14. The system of claim 10, wherein the clock squelch circuit is configured to squelch the recovered clock signal when any of the descrambler status signal, the remote receiver status signal, and the link status signal indicates failure.

15. The system of claim 10, wherein the recovered clock signal is any of a clock signal recovered from a copper media and a clock signal recovered from a fiber media.

16. The system of claim 10, wherein:
    the clock squelch circuitry is configured to receive an external clock squelch signal; and
    the clock squelch circuitry is configured to squelch the recovered clock signal when the external clock squelch signal is asserted.

17. The system of claim 10, wherein the recovered clock signal is squelched within 1 millisecond of a link failure.

18. The system of claim 10:
    wherein the recovered clock signal is coupled to at least one downstream node; and
    wherein the squelching the recovered clock signal prevents use of the recovered clock signal at the at least one downstream node.

19. An Ethernet switch configured to route data from a first port to a second port, the first port and the second port each configured for coupling to a transmission media connected to computer systems, the Ethernet switch including a switch coupled to each of the ports by at least a media access controller circuit and a physical layer circuit, the physical layer circuit configured to receive data from and transmit data to the transmission medium, the physical layer circuit including circuitry for squelching a recovered clock in an Ethernet network, the circuitry comprising:
    clock recovery circuitry configured to generate a recovered clock signal;
    receiver circuitry configured to generate a descrambler status signal and a remote receiver status signal;
    link monitor circuitry configured to generate a link status signal;
    clock squelch circuitry configured to receive the descrambler status signal, the remote receiver status signal, the link status signal, a signal indicative of whether an active link is in a 10BASE-T mode, and a signal indicative of whether the active link is in a 1000BASE-T master mode;

wherein the clock squelch circuitry is configured to squelch the recovered clock signal based on the descrambler status signal, the remote receiver status signal, the link status signal, the 10BASE-T mode signal, and the 1000BASE-T master mode signal.

20. A method for squelching a recovered clock in an Ethernet network, the Ethernet network comprising an Ethernet switch configured to route data from a first port to a second port, the first port and the second port each configured for coupling to a transmission media connected to computer systems, the Ethernet switch including a switch coupled to each of the ports by at least a media access controller circuit and a physical layer circuit, the physical layer circuit configured to receive data from and transmit data to the transmission medium and to execute the method, the method comprising:

generating a recovered clock signal;

generating a descrambler status signal;

generating a remote receiver status signal;

generating a link status signal;

receiving the descrambler status signal, the remote receiver status signal, the link status signal, a signal indicative of whether an active link is in a 10BASE-T mode, and a signal indicative of whether the active link is in a 1000BASE-T master mode; and squelching the recovered clock signal based on the descrambler status signal, the remote receiver status signal, the link status signal, the 10BASE-T mode signal, and the 1000BASE-T master mode signal.

* * * * *

UNITED STATES PATENT AND TRADEMARK OFFICE
CERTIFICATE OF CORRECTION

| | | |
|---|---|---|
| PATENT NO. | : 8,179,901 B2 | Page 1 of 1 |
| APPLICATION NO. | : 12/029230 | |
| DATED | : May 15, 2012 | |
| INVENTOR(S) | : Rock et al. | |

It is certified that error appears in the above-identified patent and that said Letters Patent is hereby corrected as shown below:

In column 2, line 28, delete "diclosure" and insert --disclosure--, therefor.

In column 10, line 19, claim 12, delete "he" and insert --the--, therefor.

Signed and Sealed this
Twenty-eighth Day of August, 2012

David J. Kappos
*Director of the United States Patent and Trademark Office*